Dec. 30, 1958  E. G. HOEFS ET AL  2,866,596
DATA COMPUTER FOR CONVERTING OSCILLOGRAPH
TRACES INTO DIRECT-READING RECORDS
Filed Sept. 7, 1954  2 Sheets-Sheet 1

INVENTORS
Gail T. Litton
Edwin G. Hoefs
BY
William R. Robertson
Agent

INVENTORS
Gail T. Litton
Edwin G. Hoefs
BY William R. Robertson
Agent

United States Patent Office 2,866,596
Patented Dec. 30, 1958

2,866,596

DATA COMPUTER FOR CONVERTING OSCILLOGRAPH TRACES INTO DIRECT-READING RECORDS

Edwin G. Hoefs and Gail T. Litton, Dallas, Tex., assignors to Chance Vought Aircraft, Incorporated, Dallas, Tex., a corporation of Delaware Application September 7, 1954, Serial No. 454,537

18 Claims. (Cl. 235—61)

This invention relates to data computers and more particularly to a data computer for converting oscillograph traces into direct-reading records.

Oscillograph records, or oscillograms, are a primary form of recorded, dynamic data obtained from sensing and measuring means such as strain gages, thermocouples, pressure gages, and the like. While unexcelled for convenience and accuracy for recording data in highly diverse fields of investigation, the oscillograph produces a record not generally constituting immediately usable engineering information. An oscillogram consists of a rolled strip of paper along which are traced waveforms—referred to as traces—that are analogs of the conditions measured. One oscillogram may contain many traces. In each trace, the time vector of the function shown is measurable along the paper's length and is indicated at precise time intervals by time lines lying across the oscillogram, or by other time-indicating marks photographically inscribed on the oscillogram during the recording of data. Uniformity of time line spacing is entirely dependent upon uniformity of oscillograph paper drive speed. Quantitative measure of the function at a particular instant is indicated by displacement of the trace up or down in reference to a theoretical line of zero deflection running lengthwise of the paper. This zero deflection line is not shown, but must be located for each trace by scaling upward a calculated distance from a zero reference trace that is recorded along the oscillogram's bottom edge. Similarly, scale lines are not provided for indicating deflection of traces away from their respective zero deflection lines.

Oscillogram traces may be either linear or non-linear in form. In a linear trace, deflection amplitude varies proportionally to and exactly with increasing and decreasing values of the function measured. Thus, where a given deflection represents a given measured value, a doubled or tripled value is represented by a doubled or tripled trace deflection. In non-linear measurements this is not the case and interpretation of trace-forms is more complex. The deflection values of a non-linear trace are not directly proportional to function value, but vary in a pattern peculiar to the individual trace. Non-linear traces must be converted into linear form before final plotting of the data presented.

Data is frequently recorded by the oscillograph in reversed phase with the result that the data, as it appears on the oscillogram, is inverted. In addition to other procedures required in the conversion of such data, inverted traces must be reversed when plotted. Without indicated amplitude scale, seldom of convenient size, and either linear or non-linear in form, the numerous traces of an oscillogram must be selected, interpreted, and plotted on scale paper to the sizes and in the arrangement or order most convenient for meaningful presentation. The standard procedure for obtaining usable time history analyses from oscillograph records is the so-called manual method. By this method, each significant point of a continuously recorded curve is laboriously read with a scale from a reference line, tabulated, subtracted from a reference quantity, multiplied by a calibration constant, scanned from a calibration curve, and manually plotted on a graph. Although of a plodding, routine character in many of their aspects, these complex operations require for their accomplishment personnel of relatively extensive mathematical and technical training who, while reducing data by this procedure, are restrained from other activities and duties wherein their abilities and knowledges may be pressingly needed.

The possibility of human error is inherent in each of the many steps required for manual reduction of oscillograph records. Because computed from discrete points along continuously recorded curves, the information obtained is never complete, and may omit significant information. Finally, the man-hour cost of analysis by the manual method is prohibitive, and complete time histories of dynamic data are seldom obtained by its use. Decisions and judgments must accordingly rest upon samplings and selections more or less accurately winnowed as time permits from the wealth of available data, and much needed research may go undone.

It is desirable, therefore, to provide a data computer which may efficiently be operated by briefly trained, relatively unskilled personnel, and is capable of easily and quickly converting oscillograph traces into direct-reading records plotted to known and convenient amplitude and time scales.

Accordingly, it is an object of the invention to provide a new and improved computer for converting oscillograph traces into direct-reading graphs or records.

An additional object of the invention is to provide an electrical follow-up device which, in consequence of a first movement imparted thereto, responds by producing a second movement of selectively variable relation to the first.

Another object of the invention is to provide a computer, of the type described, which permits a plurality of simultaneously recorded oscillograph traces to be individually and successively converted to direct-reading records, plotted to convenient amplitude scales and to the same convenient time scale on a single chart, whereby the plurality of direct-reading records may easily be intercompared to ascertain the relation of various functions at selected times.

Still another object of the invention is to provide a new and improved computer, of the type described, which has a plurality of channels for converting linear traces into direct-reading records, each of the channels being adjustable to convert a particular trace of a function whose deflection amplitude varies proportionally to and exactly with the function.

A further object of the invention is to provide a new and improved computer, of the type described, having means cooperable with the linear channels for converting non-linear traces into direct-reading records, the non-linear traces having deflection amplitudes which do not vary proportionally and exactly with the value of the function being measured.

A still further object of the invention is to provide a computer, of the type described, having means for establishing different ranges for individual graphs plotted on the same chart to avoid overlapping of graphs.

Other objects and advantages will be apparent from the specification and claims, and from the accompanying drawings which illustrate an embodiment of the invention.

Briefly stated, the invention includes a first potentiometer having a resistance element and a contact, the contact being movable over the resistance element and adapted for receiving an input motion. The ends of the first potentiometer are electrically connected to corresponding ends of a follow-up potentiometer having a resistance element and a contact movable thereover. The device further includes a responding means, which may employ, for instance, an electrically driven motor, for producing a movement in accordance with movement of the contact of the first potentiometer, and the responding means is connected to the first potentiometer contact by connecting means which comprise a resistance bridge including the resistance element of the first potentiometer, the follow-up potentiometer, and variable resistance means. By adjustment of the variable resistance means, the relation of movement of the responding means to movement of the first potentiometer contact may be selectively varied. As applied to the example described herein, a new and improved data computer for converting oscillograph traces or the like into direct-reading records or graphs of known amplitude and time scales, the invention includes a tracing board on which the oscillogram is secured and which is provided with a carriage which is mounted for movement over the oscillogram. A trace-amplitude signal producing means is mounted on the carriage and includes a follower, such as a stylus, which is manually operable to follow the trace as the carriage is moved over the oscillogram. The trace-amplitude signal is fed to a computer which converts the trace-amplitude signal to a marker-control signal of desired amplitude and linearity. The marker-control signal is then employed to control the movement of a recorder marker, for instance a pen, which produces a direct-reading record of known amplitude and time scales on a chart. The data computer also includes means for moving the chart past the recorder marker in synchronism with the movement of the carriage over the oscillogram.

For a better understanding of the invention, reference may be had to the following description taken in connection with the accompanying drawing in which.

Figure 1:
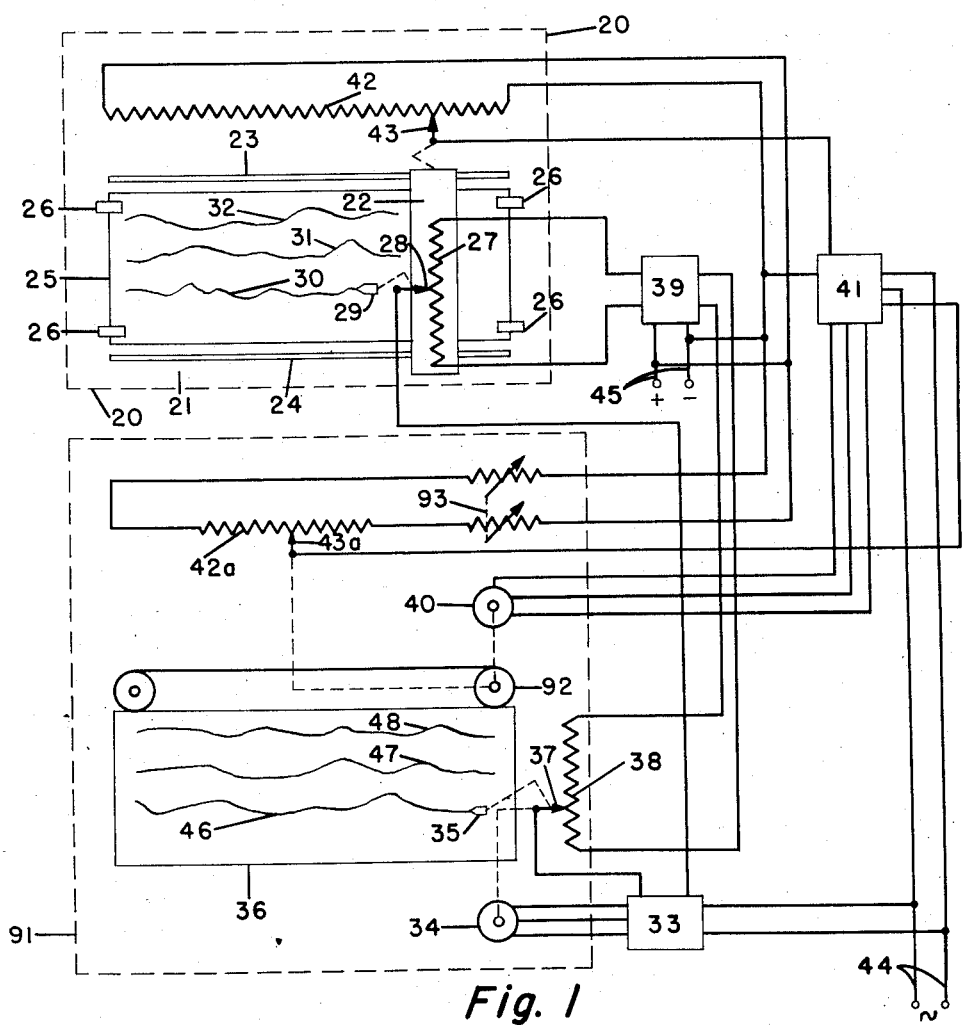
Figure 1 is a schematic diagram of the data computer.

Referring now particularly to Figure 1 of the drawing, the data computer includes a tracing board assembly 20 which comprises a base 21 on which a carriage 22 is mounted by any suitable means, such as tracks 23 and 24, for longitudinal movement thereover. The oscillogram sheet 25 is detachably mounted on the base 21 between the tracks 23 and 24 and below the carriage 22 by spring clips 26, by an adhesive tape, not shown, or in any other suitable manner.

The carriage 22 supports a potentiometer 27 which is contacted by a wiper contact 28 which is movable transversely of the base. A follower means comprising a tracing stylus 29 is mounted on the carriage 22. The stylus is mechanically connected to the wiper contact and is movable therewith.

The tracer stylus, in following one of the oscillogram traces 30, 31, or 32, is manually moved transversely of the base as the carriage is moved longitudinally of the base. The wiper contact 28 is electrically connected to a servo amplifier 33 of a responding means which further comprises a marker-moving means, the latter means including a pen motor 34 which, under control of the servo amplifier 33, moves the pen 35 transversely across the chart 36 of a recorder 91. The pen 35 is mechanically connected to the wiper contact 37 of the follow-up potentiometer 38, while the opposite ends of the stylus potentiometer 27 and of the follow-up potentiometer 38 are connected to a set of computer channels generally represented at 39 which serve, as will be further explained, to vary the control signal derived from the follow-up potentiometer wiper contact 37 and the stylus potentiometer wiper contact 28 in the desired manner to produce direct-reading records or lines on the chart 36 having predetermined amplitude and time scales.

The chart-moving means includes a motor 40 and drive 92. Inasmuch as in certain applications the oscillogram has several simultaneously obtained traces, such as the traces 30, 31 and 32, which must be compared, the chart motor 40 is controlled by the servo amplifier 41 to move the chart 36 by means of a chart drive 92 past the pen 35 in accordance with the movement of the carriage 22 across the oscillogram 25 in either direction. Means employed between the carriage and the chart-moving means in order to obtain this simultaneous movement include the servo amplifier 41 and also a chart follow-up potentiometer 42A disposed within the recorder and a potentiometer 42, which may be a slide wire, disposed on the base 21 of the tracing board assembly parallel to the path of movement of the carriage. The follow-up potentiometer wiper contact 43A is mechanically connected to the chart drive 92 and moves proportionally therewith, whereas the wiper contact 43 which contacts the potentiometer 42 is secured to the carriage and moves therewith, whereby a signal is delivered to the servo amplifier 41 which is derived from the voltage differential existing between the chart follow-up wiper contact 43A and the wiper contact 43. Conventional chart-sensitivity potentiometers 93 are employed to vary the multiplier constant between the carriage motion and the resulting chart motion. The potentiometers 42, 42A, and 93 are interconnected in a usual and conventional manner which will not therefore be described in detail.

The servo amplifiers 41 and 33 are supplied with alternating current from the supply circuit 44. The direct current for the computer channels 39 is supplied by the supply circuit 45.

It will now be apparent that each time the stylus 29 is moved, the signal transmitted to the computer channels 39 is varied to cause the pen motor 34 to move the pen 35 and the wiper contact 37 in the appropriate direction until the contact 37 is at the null balance point of the follow-up potentiometer 38. For each change in the position of the stylus, the pen is moved to a new null balance point on the follow-up potentiometer. The chart motor 40, through the chart drive 92 which is mechanically connected both to the motor 40 and the chart 36, similarly moves the chart 36 for each change in the position of the carriage. It will thus be seen that a number of traces of the oscillogram may be converted to true direct-reading records, graphs or lines, as at 46, 47 and 48, on the chart and that the values represented by the graphs will at all points be in the same time relationship as in the traces since the chart moves back and forth with the movement of the carriage across the oscillogram.

Figure 2:
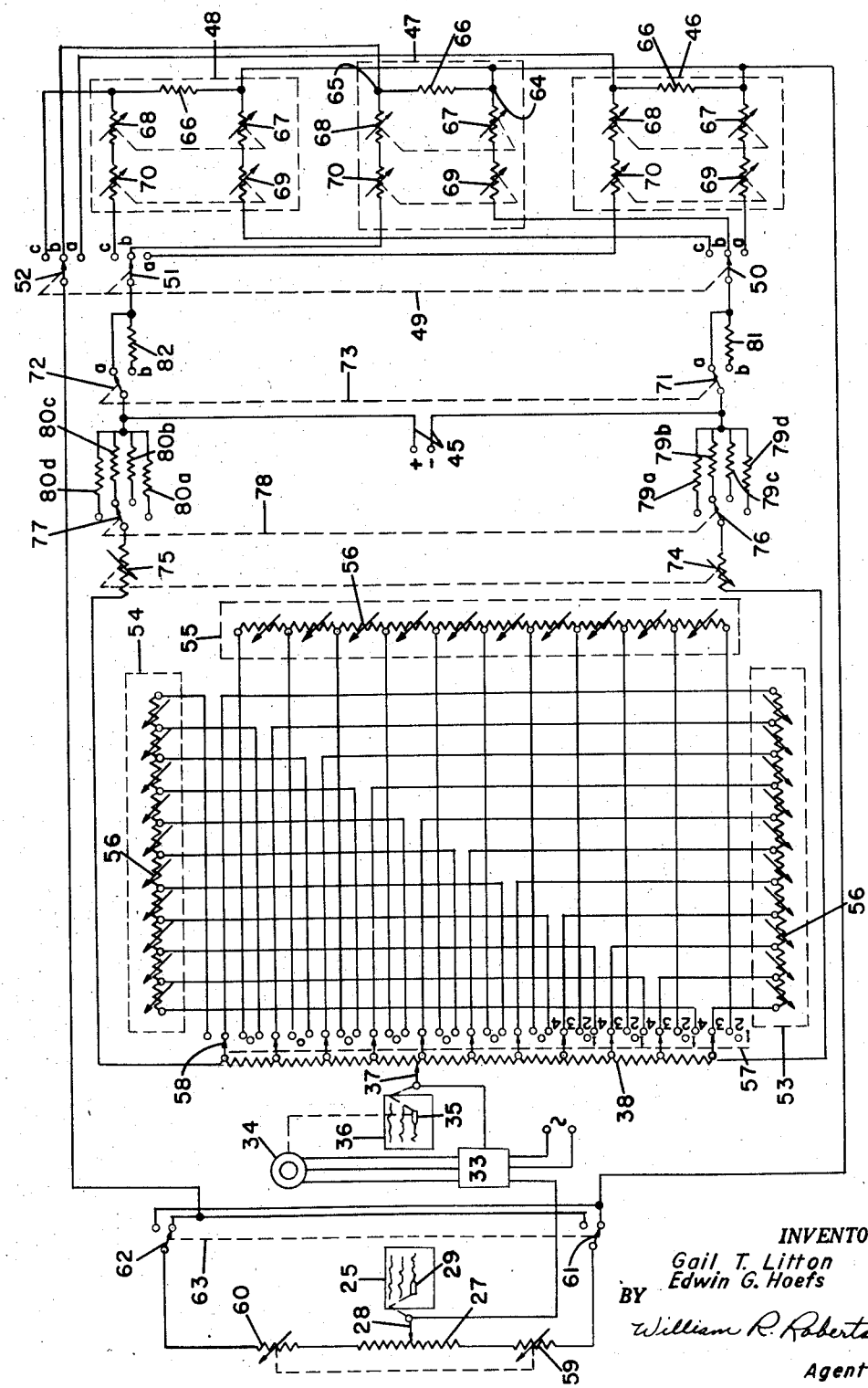
Figure 2 is a circuit diagram of a data computer having a plurality of linear channels for converting linear traces into direct-reading records and a plurality of non-linear channels selectively cooperable with the linear channels for converting non-linear traces into direct-reading records.

The computer means comprises a resistance bridge which includes the computer channels 39, the stylus potentiometer 27, and the pen follow-up potentiometer 38. Referring now to Figure 2 of the drawing, the set of computer channels 39 comprises three linear channels 46, 47 and 48 which may be selectively connected into the resistance bridge by means of the switch 49 which includes the contacts 50, 51 and 52. The contacts 50, 51 and 52 are connected together and move simultaneously between any of the three positions $a$, $b$, and $c$. The set of computer channels also includes three non-linear channels 53, 54 and 55, each of which consists of ten potentiometers 56 which are connected across ten consecutive segments of the pen follow-up potentiometer 38 by a switch 57 having eleven contacts 58 which are simultaneously movable between any of the four positions 1, 2, 3 and 4. The function of these potentiometers will be explained below.

Assuming now that the contacts 50, 51 and 52 of the linear channel selector switch 49 are in their $b$ positions as shown in Figure 2, the linear channel 47 is connected in the resistance bridge of the computer. Opposite ends of the stylus potentiometer 27 are connected through the variable zero setting resistances 59 and 60 and the contacts 61 and 62 of the phase reversing switch 63 to opposite ends 64 and 65 of the resistance 66. The opposite ends 64 and 65 of the resistance are connected to the direct current supply 45 through the balance potentiometers 67 and 68, the sensitivity potentiometers 69 and 70, the contacts 50 and 51 of the linear channel selector switch 49, and the contacts 71 and 72 of the multiplier switch 73. The functions of these potentiometers and switches will be explained below.

Opposite ends of the follow-up potentiometer 38 are connected to opposite sides of the direct current supply circuit through current control potentiometers 74 and 75, the contacts 76 and 77 of the range selector switch 78, and the range resistances 79b and 80c. Thus the wiper contacts 28 and 37 are on opposite ends of and are connected by the resistance bridge. The follow-up contact 37 is connected to the servo amplifier 33; accordingly, the computer bridge and the wiper contact 37 constitute connecting means which connect the stylus wiper contact 28 to the servo amplifier 33, the latter in turn being connected to the pen motor 34. Consequently, a change in the position of the wiper contact 28 on the potentiometer 27 will cause an unbalance in the bridge causing a signal to be transmitted from the wiper contact 37 of the follow-up potentiometer 38 to the servo amplifier 33 which responds by causing the pen motor 34 to move the pen and the wiper contact 37 until the latter again is at a null balance point on the follow-up potentiometer 38.

While the pen is thus caused to move in accordance with the movement of the stylus, the relative movement of the pen with respect to the stylus may be varied by adjusting the multiplier switch 73 and the sensitivity potentiometers 69 and 70. The multiplier switch 73 serves to introduce the equal resistances 81 and 82 into the half of the resistance bridge which includes the stylus potentiometer 27, this introduction being effected at points lying between the stylus potentiometer 27 and the supply circuit 45. As a result of a decrease which occurs in the voltage gradient across the opposite ends of the stylus potentiometer when the resistances 81 and 82 are introduced as described, the voltage differential arising between the stylus potentiometer wiper contact 28 and the follow-up potentiometer wiper contact 37 when the stylus is displaced a given distance is decreased in proportion to the resistance introduced. Since the signal voltage supplied to the servo amplifier 33 is derived from this voltage differential, introduction of the resistances 81 and 82 results in a decrease in the distance moved by the pen in response to a given movement of the stylus.

It will now be apparent that the multiplier switch 73 permits two ranges of sensitivity since it is a two-position switch. It will be obvious that by employing a switch having more than two positions and providing other equal resistances of different value than the resistances 81 and 82, additional ranges of sensitivity could be obtained. The resistances 81 and 82 are equal to prevent unbalance of the bridge when they are inserted in or removed from the bridge.

The sensitivity potentiometers, 69 and 70, which are of equal value and which, in order to prevent unbalance of the bridge, are mechanically connected together so as to be always of equal value upon their adjustment, are employed to vary the multiplier constant that is applied to the function being plotted and which is represented by a particular trace on the oscillogram. The sensitivity potentiometers operate within either of the two ranges of sensitivity determined by the position of the multiplier switch 73.

The balance potentiometers 67 and 68 are likewise equal in value and are mechanically connected together so that when the balance potentiometers are adjusted the algebraic summation of their resistances remains constant and does not change the voltage gradient across the stylus carriage potentiometer 27. Thus, a constant sensitivity is maintained regardless of changes in balance adjustment. The balance potentiometers 67, 68 are employed to adjust the data zero on the chart in relation to the stylus position.

The range selector switch 78 is employed to select the particular range of movement of the pen transversely of the chart in order to prevent overlapping of lines or graphs drawn by the pen when such overlapping is not desired. The resistances 79a, 79b, 79c and 79d are equal in value to the resistances 80a, 80b, 80c, and 80d, and the contacts 76 and 77 move simultaneously in the same direction. Hence, it will be apparent that the arms of the half of the bridge on opposite sides of the stylus potentiometer are unbalanced in a predetermined manner when the range selector switch is moved from one to another of its four positions. However, the total resistance of the half of the resistance bridge which includes the stylus potentiometer 27 is maintained equal since the difference in value between adjacent resistances is equal. For example, the resistances 79a, 79b, 79c and 79d may have values of 25 ohms, 45 ohms, 65 ohms and 85 ohms respectively. This entails that the values of resistances 80a, 80b, 80c and 80d are also 25 ohms, 45 ohms, 65 ohms and 85 ohms respectively.

Inasmuch as the linear channels 46 and 48 are identical in structure and function to the linear channel 47, they will not be described in detail, and corresponding elements of the linear channels 46 and 48 have been given identical reference characters.

The constant current potentiometers 74 and 75 are set at a zero resistance value when linear traces are being converted and are provided only for use when a non-linear channel is to be used as will be explained below. In order to prevent unbalance of the bridge, the constant current potentiometers 74 and 75 are mechanically connected together so that throughout their range of adjustment they are of equal value.

Each of the non-linear channels 53, 54 and 55 consists of ten potentiometers adapted to be connected across consecutive segments of the follow-up potentiometer 38 by the switch 57. Each of the potentiometers is individually adjustable so that the resistances across different segments of the follow-up potentiometer may be varied as required when the trace of the oscillogram is of non-linear form and must be converted to a direct-reading graph of linear form.

The mode of operation of the data computer will now be described. Let it be assumed that the oscillogram 25, as seen in Figure 1, has three traces, 30, 31, and 32, which represent certain values obtained simultaneously by the use of appropriate measuring devices. Let it further be assumed that the trace 30 is a linear trace, i. e., the transverse deflection or amplitude with respect to the oscillogram 25 varies proportionately to and exactly with the value of the function measured by the measuring device. It is desired that the amplitude of the graph 46 on the chart 36 which will correspond to the trace 30 be a certain multiple of the amplitude of deflection of the trace 30. The oscillogram is secured to the base 21 by means of the spring clips 26, and the carriage 22 is positioned so that the stylus is positioned at one end of the trace 30. The position of the graph 46 on the chart 36 is predetermined by use of the range switch 78. For example, the range switch may be adjusted to the position shown in Figure 2 wherein the trace 46 will be made in the second lowest position on the chart 36 as seen in Figure 1.

If it is desired that the range of plotting be over a relatively large width of the paper, the multiplier switch 73 is moved to the position shown in Figure 2. If it were desired to plot the graph over a relatively small width of the chart, the switch 73 would be moved to its position *b* wherein the resistances 81 and 82 would be included in the resistance bridge.

The balance potentiometers 67 and 68 are then adjusted to place the data zero on the chart in a desired location thereon. Next, the sensivity potentiometers 69 and 70 are adjusted to provide the necessary multiplier constant that is to be applied to the trace 30. For example, if it is desired that the amplitude of the graph 46 be three times the amplitude of the trace 30, the sensitivity potentiometers 69 and 70 are adjusted to obtain this result.

The phase switch 63 is then positioned as desired to obtain the proper phase relationship between the trace 30 and the graph 46. For example, if the trace 30 has been obtained by the use of a recording device which caused a downward deflection of the trace 30 upon an increase in the value measured, it is desirable that the phase relationship between the stylus and the pen be reversed so that when the stylus moves up on the oscillogram 25 the pen will move downwardly on the chart 36. Let it be assumed that, with the switch 63 in the position shown in Figure 2, the pen and stylus move together in the same phase. When it is desired to reverse the phase, the switch 63 is moved to its other position.

The non-linear channel selector switch 57 is then moved downward so that all the contacts 58 rest in the open position 1. The consant current potentiometers 74 and 75 are set at zero resistance. The carriage is then moved longitudinally over the oscillogram, which causes the chart 36 to be moved in accordance therewith. At the same time, the stylus is manually moved to and fro in following the trace 30, causing the pen arm 35 to move in accordance therewith and with an amplitude which corresponds to a precise multiple of the amplitude of motion of the stylus 29, said multiple having been established by positioning of the multiplier switch 73 and the sensitivity potentiometers 69 and 70. When the carriage has been moved the full length of the oscillogram, the trace 30 will have been reproduced as the graph 46 on the chart 36.

If it is then desired to reproduce the trace 31, the carriage is returned to its original position, the chart 36 moving back simultaneously therewith so that when the graph 47, which will indicate the function represented by the trace 31, is plotted on the chart 36, it will be positioned on the chart 36 in the same time relationship to the graph 46 as the trace 30 is to the trace 31. The range switch 78 is then moved to another position if it is desired that the graph 47 be displaced transversely from the graph 46. Since, because of peculiarities inherent in the data-sensing devices, the trace 31 is non-linear in form, so that its deflection amplitude does not vary directly in proportion to the value of the function represented thereby, it is necessary that one of the non-linear channels be connected across the pen follow-up potentiometer 38 in order that the non-linear channel may operate in conjunction with a chosen linear channel which, when properly adjusted, establishes an over-all amplitude multiplier constant modified, as will be described, by adjustment of the cooperating non-linear channel. For example, as shown in Figure 2, the non-linear channel 53 may be connected to the follow-up potentiometer 38 by moving the switch 57 to the position shown. To obtain the proper slope ratios within consecutive segments of the follow-up potentiometer, each of the variable potentiometers 56 of the channel 53 is then adjusted to a particular value previously determined by a calibration operation involving the particular measuring device employed to obtain the trace 31.

The connection of the various potentiometers 56 of the non-linear channel across the follow-up potentiometer 38 changes the total resistance of the half of the resistance bridge which includes the follow-up potentiometer 38. This will change the sensitivity of the bridge. The variable resistances 74 and 75 are provided to compensate for this change in resistance and are set by adding the resistance changes created by each potentiometer 56, the result determining the actual setting of the resistances 74 and 75 from a previously prepared calibration curve. Necessary adjustment of the cooperating linear channel controls is then accomplished in the manner already above described, said adjustment including adjustment of the linear channel balance and sensitivity potentiometers to positions wherein desired and proper overall operational constants are established. The carriage is then moved longitudinally across the oscillogram 25 and the stylus is moved along the trace 31 as before described to cause the graph 46 to be drawn on chart 36 by the pen 35.

If it is then desired to convert the trace 32 to the graph 48 and if trace 32 is non-linear in form, the non-linear channel selector switch 57 may be moved to position 2 or 4 to connect the non-linear channels 55 or 54, respectively, across the follow-up potentiometer 38. The variable potentiometers 56 of the selected non-linear channel are then individually adjusted as required by the inherent characteristics of the measuring device which measured the function recorded as the trace 32. The range switch 78 may then be moved to the third position, if it is desired to displace the graph 48 from the graph 47 previously plotted, and the process is repeated to produce the graph 48. It will be noted that the graphs 46, 47, and 48 represent the measured functions in the same time relationship as when measured so that these functions may be readily compared.

In use, the oscillogram 25 often contains many (for example, up to 54) traces. Very often, a series of tests is run wherein the same or equivalent sensing and measuring means and oscillograph measure and record the same quantities again and again, thus producing on successive oscillograms or on succeeding sections of the same oscillogram a series of traces which necessarily must be converted into direct-reading records. Various potentiometers of the linear and non-linear channels may in such cases be pre-set to the values necessary for use with each particular trace so that, by the use of the switches 57 and 49, the same setting may be maintained on each channel throughout the graphing of a whole series of graphs.

It will be apparent that, while only three non-linear and three linear channels have been shown and described, the data computer may be constructed employing as many linear and non-linear channels as may be desired. It will also be apparent that the various switches may be of the rotary type to accommodate a great number of switching positions.

Figure 3:
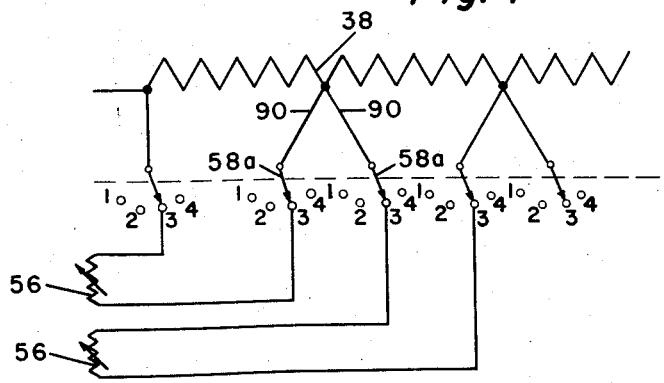
Figure 3 is a fragmentary diagram of a modified form of a non-linear channel.

For simplicity of illustration, adjacent variable potentiometers of the non-linear channels are shown in Figure 2 as connected to common taps on adjacent ends. It has been found desirable to provide separate taps 90 for each variable potentiometer, as shown in Figure 3, and this necessitates additional contacts 58a in the non-linear channel selector switch. The common or single taps shown in Figure 2 provide undesirable parallel circuits which decrease the precision of the non-linear channels.

It will be apparent that the non-linear channels could also be connected across the stylus potentiometer 27 if so desired.

It will now be seen that an embodiment of the invention comprising a new and improved data computer has been illustrated and described which includes a stylus carriage which is electrically connected to a recorder chart motor whereby the chart moves in accordance with the movement of the carriage over the oscillogram; a stylus connected to the wiper contact of a potentiometer carried by the carriage for following a trace of the oscillogram as the carriage is moved thereover; and a computer responsive to the position of the stylus contact for controlling the movement of the pen of the recorder in accordance with the movement of the stylus. Moreover, it will be seen that the computer comprises a resistance bridge having a plurality of linear and non-linear channels which may be selectively connected in the bridge, and that the channels each include various resistances which may be preset to vary the proportional movement of the pen relative to the movement of the stylus in a predetermined manner.

While only one embodiment of the invention has been shown in the accompanying drawings, it will be evident that various modifications are possible in the arrangement and construction of the data computer components without departing from the scope of the invention.

We claim:

1. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage.

2. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means having components connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage, said computer means including a resistance bridge comprising said potentiometer, a follow-up potentiometer having a contact movable with said pen, and variable resistance means for varying the predetermined relation of movement of said pen to the movement of said stylus.

3. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage, said stylus having a predetermined range of transverse movement, said computer means varying the predetermined relation of movement of said pen to the movement of said stylus in a predetermined manner over different portions of said range.

4. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means having components connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage, said computer means including a resistance bridge comprising said potentiometer, a follow-up potentiometer having a contact movable with said pen, and variable resistance means connected across said follow-up potentiometer for varying the predetermined relation of movement of said pen to the movement of said stylus, said stylus having a predetermined range of transverse movement, said computer means varying the predetermined relation of movement of said pen to the movement of said stylus in a predetermined manner over different portions of said range.

5. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage, said computer means including a plurality of linear channels selectively connectable to said contact and potentiometer and said pen-moving means, each of said linear channels being adjustable to afford different predetermined relations of movement of the pen to the movement of the stylus.

6. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means connected between said contact and potentiometer and said pen-moving means and responsive to movement of said stylus for causing movement of said pen in accordance with the movement of said stylus and in a predetermined relation to said movement of said stylus; and means between said carriage and said chart-moving means for causing movement of said chart in accordance with the movement of said carriage, said computer means including a plurality of linear channels selectively connectable to said contact and potentiometer and said pen-moving means, each of said linear channels being adjustable to afford different predetermined relations of movement of the pen to the movement of the stylus, said computer including a plurality of non-linear channels, each selectively connectable with any of said linear channels for varying the predetermined relation of movement of said pen to the movement of said stylus over different portions of the range of movement of said stylus.

7. A device of the type described for converting oscillogram traces into graphs of desired amplitude scale comprising: a carriage movable longitudinally over an oscillogram, follower means on said carriage movable transversely of said oscillogram for following an oscillogram trace; a recorder having a movable chart, a marker, means for moving said chart longitudinally past said marker, and means for moving said marker transversely across said chart; computer means connected between said follower means and said marker moving means and responsive to the movement of said follower means for causing said marker moving means to move said marker in a predetermined relation to the movement of said follower means; and means connected between said carriage and said chart-moving means for causing said chart-moving means to move said chart in accordance with the movement of said carriage.

8. A device of the type described for converting oscillogram traces into graphs of desired amplitude scale comprising: a carriage movable longitudinally over an oscillogram, follower means on said carriage movable transversely of said oscillogram for following an oscillogram trace; a recorder having a movable chart, a pen, means for moving said chart longitudinally past said pen, and means for moving said pen transversely across said chart; computer means connected between said follower means and said pen-moving means and responsive to the movement of said follower means for causing said pen-moving means to move said pen in a predetermined relation to the movement of said follower means; and means connected between said carriage and said chart-moving means for causing said chart-moving means to move said chart in accordance with the movement of said carriage, said follower means having a predetermined range of transverse movement, said computer means varying the predetermined relation of movement of said pen to the movement of said follower means in a predetermined manner over different portions of said range.

9. A device of the type described for converting oscillogram traces into graphs of desired amplitude scale comprising: a carriage movable longitudinally over an oscillogram, follower means on said carriage movable transversely of said oscillogram for following an oscillogram trace; a recorder having a movable chart, a pen, means for moving said chart longitudinally past said pen, and means for moving said pen transversely across said chart; computer means connected between said follower means and said pen-moving means and responsive to the movement of said follower means for causing said pen-moving means to move said pen in a predetermined relation to the movement of said follower means; and means connected between said carriage and said chart-moving means for causing said chart-moving means to move said chart in accordance with the movement of said carriage, said computer means comprising a plurality of linear channels selectively connectable between said follower means and said pen-moving means, each of said linear channels being selectively adjustable to vary said predetermined relation.

10. A device of the type described for converting oscillogram traces into graphs of desired amplitude scale comprising: a carriage movable longitudinally over an oscillogram, follower means on said carriage movable transversely of said oscillogram for following an oscillogram trace; a recorder having a movable chart, a pen, means for moving said chart longitudinally past said pen, and means for moving said pen transversely across said chart; computer means connected between said follower means and said pen-moving means and responsive to the movement of said follower means for causing said pen-moving means to move said pen in a predetermined relation to the movement of said follower means; and means connected between said carriage and said chart-moving means for causing said chart-moving means to move said chart in accordance with the movement of said carriage, said computer means comprising a plurality of linear channels selectively connectable between said follower means and said pen-moving means, each of said linear channels being selectively adjustable to vary said predetermined relation, said computer means comprising a plurality of non-linear channels selectively connectable to any of said linear channels for varying said predetermined relation over different portions of the range of movement of said follower means.

11. A device of the type described for converting oscillogram traces into graphs of desired amplitude scale comprising: a carriage movable longitudinally over an oscillogram, a stylus movable transversely of said oscillogram for following an oscillogram trace; a recorder having a movable chart, a pen, means for moving said chart longitudinally past said pen, and means for moving said pen transversely across said chart; computer means comprising a resistance bridge including a potentiometer mounted on said carriage and transversely of said oscillogram, a contact connected to said stylus and movable over said potentiometer, a follow-up potentiometer, a contact connected to said stylus and movable over said follow-up potentiometer; and means responsive to the positions of said contacts on said potentiometers and connected to said pen-moving means for moving said pen in a predetermined relation to the movement of said stylus.

12. A device of the type described for converting oscillogram traces into graphs of desired amplitude scale comprising: a carriage movable longitudinally over an oscillogram, a stylus movable transversely of said oscillogram for following an oscillogram trace; a recorder having a movable chart, a pen, means for moving said chart longitudinally past said pen, and means for moving said pen transversely across said chart; computer means comprising a resistance bridge including a potentiometer mounted on said carriage and transversely of said oscillogram, a contact connected to said stylus and movable over said potentiometer, a follow-up potentiometer, a contact connected to said pen and movable over said follow-up potentiometer; means responsive to the positions of said contacts on said potentiometers and connected to said pen-moving means for moving said pen in a predetermined relation to the movement of said stylus; and a plurality of linear channels selectively connectable in said resistance bridge, between said potentiometers, each of said linear channels having variable resistances whereby said predetermined relation may be preset.

13. A device of the type described for converting oscillogram traces into graphs of desired amplitude scale comprising: a carriage movable longitudinally over an oscillogram, a stylus movable transversely of said oscillogram for following an oscillogram trace; a recorder having a movable chart, a pen, means for moving said chart longitudinally past said pen, and means for moving said pen transversely across said chart; computer means comprising a resistance bridge including a potentiometer mounted on said carriage and transversely of said oscillogram, a contact connected to said stylus and movable over said potentiometer, a follow-up potentiometer, a contact connected to said pen and movable over said follow-up potentiometer; means responsive to the positions of said contacts on said potentiometers and connected to said pen-moving means for moving said pen in a predetermined relation to the movement of said stylus; a plurality of linear channels selectively connectable in said resistance bridge, between said potentiometers, each of said linear channels having variable resistances whereby said predetermined relation may be preset; and a plurality of non-linear channels selectively connectable across said follow-up potentiometer for varying said predetermined relation over different portions of the range of movement of said stylus.

14. A device of the type described for converting oscillogram traces into graphs of desired amplitude scale comprising: a carriage movable longitudinally over an oscillogram, a stylus movable transversely of said oscillogram for following an oscillogram trace; a recorder having a movable chart, a pen, means for moving said chart longitudinally past said pen, and means for moving said pen transversely across said chart; computer means comprising a resistance bridge including a potentiometer mounted on said carriage and transversely of said oscillogram, a contact connected to said stylus and movable over said potentiometer, a follow-up potentiometer, a contact connected to said pen and movable over said follow-up potentiometer; means responsive to the positions of said contacts on said potentiometers and connected to said pen-moving means for moving said pen in a predetermined relation to the movement of said stylus; a plurality of linear channels selectively connectable in said resistance bridge, between said potentiometers, each of said linear channels having variable resistances whereby said predetermined relation may be preset; and a plurality of non-linear channels selectively connectable across said follow-up potentiometer for varying said predetermined relation over different portions of the range of movement of said stylus, each of said non-linear channels comprising a plurality of individually variable resistances connected across successive segments of said follow-up potentiometer.

15. A device of the type described for converting oscillogram traces into graphs of desired amplitude scale comprising a base on which an oscillogram may be secured; a carriage movable longitudinally over the base; a first potentiometer mounted on said base and having a first contact connected to said carriage; a stylus on said carriage movable transversely of said oscillogram for following an oscillogram trace; a second potentiometer mounted on said carriage and having a second movable contact connected to said stylus; a recorder having a movable chart, a pen, means for moving said chart longitudinally past said pen, and means for moving said pen transversely across said chart; computer means connected between said second contact and second potentiometer and said pen moving means and responsive to movement of said stylus for causing movement of said pen in accordance with the movement of said stylus and in a predetermined relation to movement of said stylus; and means connected between said first contact and first potentiometer and said chart moving means for causing movement of said chart in accordance with the movement of said carriage.

16. A device of the type described for converting oscillogram traces into graphs of desired amplitude scale comprising a base on which an oscillogram may be secured; a carriage movable longitudinally over the base; a first potentiometer mounted on said base and having a first contact connected to said carriage; a stylus on said carriage movable transversely of said oscillogram for following an oscillogram trace; a second potentiometer mounted on said carriage and having a second movable contact connected to said stylus; a recorder having a movable chart, a pen, means for moving said chart longitudinally past said pen, and means for moving said pen transversely across said chart; computer means connected between said second contact and second potentiometer and said pen moving means and responsive to movement of said stylus for causing movement of said pen in accordance with the movement of said stylus and in a predetermined relation to movement of said stylus; and means connected between said first contact and first potentiometer and said chart moving means for causing movement of said chart in accordance with the movement of said carriage, said last mentioned means comprising a follow-up potentiometer having a contact movable in accordance with the movement of said chart.

17. A device of the type described for converting oscillogram traces into graphs of desired amplitude scale comprising a base on which an oscillogram may be secured; a carriage movable longitudinally over the base and an oscillogram mounted thereon; a first potentiometer mounted on said base and having a first contact connected to said carriage; a stylus on said carriage movable transversely of said oscillogram for following an oscillogram trace; a second potentiometer mounted on said carriage and having a second movable contact connected to said stylus; a recorder having a movable chart, a pen, means for moving said chart longitudinally past said pen, and means for moving said pen transversely across said chart; computer means connected between said second contact and second potentiometer and said pen moving means and responsive to movement of said stylus for causing movement of said pen in accordance with the movement of said stylus and in a predetermined relation to movement of said stylus; and means connected between said first contact and first potentiometer and said chart moving means for causing movement of said chart in accordance with the movement of said carriage, said last mentioned means comprising a follow-up potentiometer having a contact movable in accordance with the movement of said chart, and variable resistance means for varying the predetermined relation of movement of said chart to the movement of said carriage.

18. A device of the type described for converting oscillogram traces into graphs of desired amplitude scale comprising: a carriage movable longitudinally over an oscillogram; a stylus on said carriage movable transversely of said oscillogram for following an oscillogram trace; a potentiometer mounted on said carriage and having a movable contact connected to said stylus; a recorder having a movable chart, a pen, means for moving said chart longitudinally past said pen, and means for moving said pen transversely across said chart; computer means connected between said contact and potentiometer and said pen-moving means and responsive to movement of said stylus for causing movement of said pen in accordance with the movement of said stylus and in a predetermined relation to said movement of said stylus; and servo-amplifier means between said carriage and said chart moving means for causing the latter means to move said chart in accordance with the movement of said carriage.

References Cited in the file of this patent

UNITED STATES PATENTS

| | | |
|---|---|---|
| 2,212,799 | Sperry | Aug. 27, 1940 |
| 2,399,329 | Beauregard | Apr. 30, 1946 |
| 2,410,651 | Glass | Nov. 5, 1946 |
| 2,442,098 | Shewell et al. | May 25, 1948 |
| 2,537,498 | Wickesser | Jan. 9, 1951 |
| 2,541,277 | Omberg | Feb. 13, 1951 |
| 2,614,327 | Russell | Oct. 21, 1952 |
| 2,638,671 | Ramsey | May 19, 1953 |
| 2,679,620 | Berry | May 25, 1954 |